July 21, 1925.
A. G. HAUCK
SHOCK ABSORBER
Filed Oct. 6, 1923
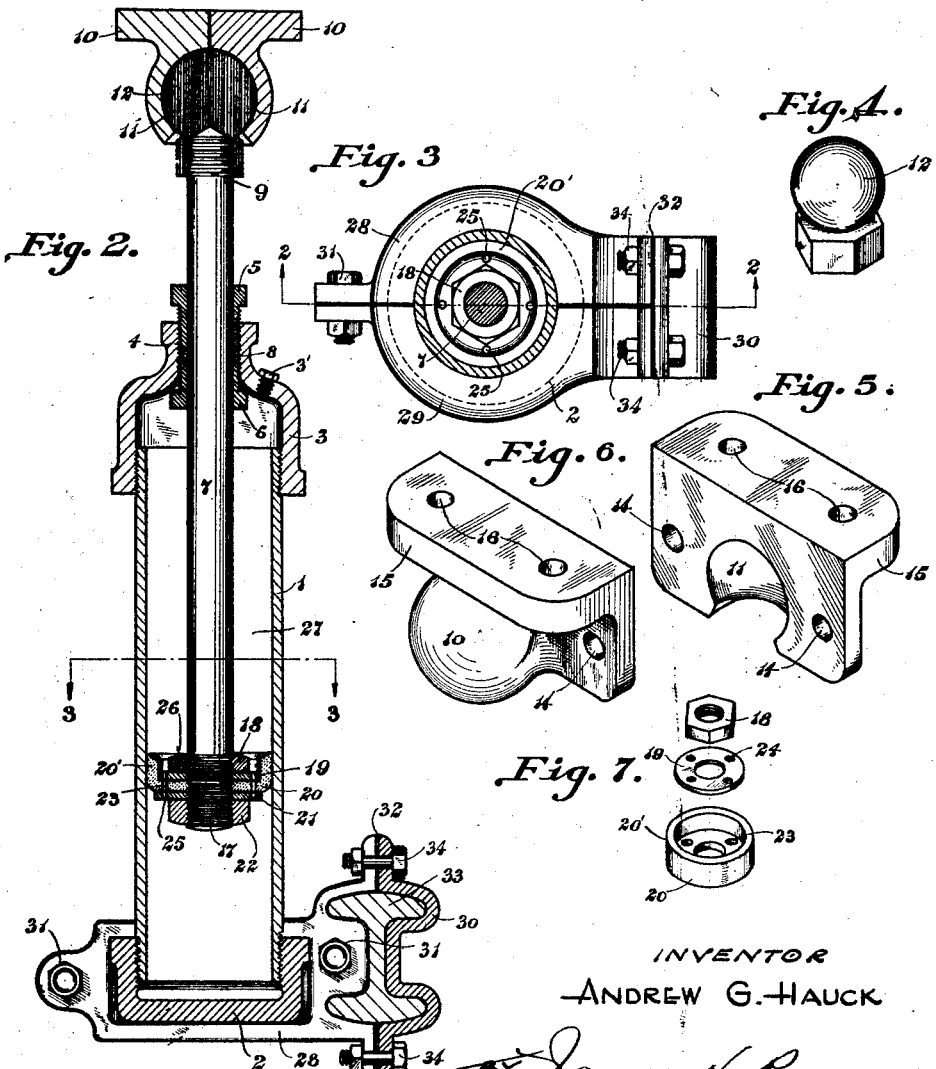
INVENTOR
ANDREW G. HAUCK
ATTORNEY Patented July 21, 1925.

1,546,894

UNITED STATES PATENT OFFICE.

ANDREW G. HAUCK, OF CINCINNATI, OHIO.

SHOCK ABSORBER.

Application filed October 6, 1923. Serial No. 667,051.

*To all whom it may concern:*

Be it known that I, ANDREW G. HAUCK, a citizen of the United States, residing at Cincinnati, in the county of Hamilton and State of Ohio, have invented certain new and useful Improvements in Shock Absorbers, of which the following is a specification.

My invention relates to novel shock absorbers and more particularly to devices of this character in which the compressive element consists of a liquid and for use on motor or other vehicles.

The usual resilient connection between the vehicle axle and chassis frame comprises a spring intended to absorb road shocks but immediately when a wheel drops into a hole or other depression in the roadway the axle drops downwardly at a high rate of velocity and the chassis frame is obliged to follow at a rate of motion less in velocity dependent upon the resilient connection between the axle and the chassis frame. The wheels when arising from the hole or depression compress the spring inasmuch as the chassis frame is moving downwardly and is met by the axle moving in an opposite direction; the spring then travels rapidly from a state of compression to a state of tension carrying with it the chassis frame of the vehicle and such other weight as may be on the frame or in the body. The momentum of the upward movement of this weight often forces the spring past its tension elastic limit thereby deforming the spring and sometimes the spring is forced past its critical limit thereby resulting in a broken spring or if the road shock is not of sufficient severity to cause injury to the spring the chassis frame and occupants who may be within the body of the vehicle are considerably shaken.

The objects of my invention are to provide means whereby road shocks transmitted to the wheels of a vehicle are absorbed between the axle and the chassis frame of the vehicle; to provide means whereby the downward movement of the axle of a vehicle exerts a greater relative pulling force against the chassis frame than when the axle movement is upwardly; to provide means whereby the springs of a vehicle are relieved of considerable strain; to provide means whereby the body of a vehicle to which my invention is attached has freedom of sidewise movement.

My invention consists in providing a cylinder closed at one end and having a fitted piston in the other end with means for rigidly fastening the lower end of the cylinder to the axle and means for rockably securing the upper end of the piston rod to the chassis frame; further, in providing a piston having perforations therein and a cup washer attached thereto and adapted to disengage close contact with the wall of the cylinder when moved downwardly and compel close contact when moved upwardly through a compressive agent retained within the cylinder.

My invention further consists in the combination and arrangement of parts and in the details of construction as herein set forth and claimed.

In the drawings:

Fig. 1 is a front elevation of a portion of an automobile with my invention attached thereto;

Fig. 2 is a vertical section of my invention taken on the line 2—2 of Fig. 3, showing the piston rod in side elevation;

Fig. 3 is a transverse section taken on the line 3—3 of Fig. 2;

Fig. 4 is a perspective view of the ball connection;

Fig. 5 is a perspective view of a portion of the socket connection showing the inner and upper sides;

Fig. 6 is a perspective view of a portion of the socket connection showing the outer and top sides; and Fig. 7 represents perspective views of the nut, metal washer and cup washer partly comprising my piston.

In the preferred construction of my device I provide a cylindrical tube 1 externally threaded at each end thereof and engaging internally threaded cap 2 at its lower end and internally threaded reducing union 3 at its upper end. The reducing union is also internally threaded in smaller end 4 for receiving externally threaded flanged tubes 5 and 6 for slidably receiving piston rod 7. Packing 8 interposed between tubes 5 and 6 insures a non-leakable joint as by closely fitting piston rod 7. The upper end of the piston rod is threaded at 9 for engaging ball member 12 of a ball and socket joint between the chassis frame and the piston rod as by socket members 10 having semi-spherical recesses 11 adapted to fit around ball 12 and secured therearound by bolts 13 received in holes 14 of the socket members having flanges 15 at their top for securing the upper portion of my invention to the chassis frame by bolts or other suitable means combinedly received by holes 16 in the socket members and by holes through the chassis frame. The lower end of piston rod 7 is threaded at 17 and enters nut 18, metal washer 19, pliable cup washer 20, metal washer 21 and nut 22. The cup washer 20 has flange 20' which extends upwardly and has holes 23 therethrough which register with holes 24 in washers 19 and 21 forming a continuous hole 25 through piston 26, (Fig. 2) for the purpose of regulating the rate of motion imparted to piston 26 by a given force acting at either end of my invention. Cylinder 1 contains a liquid 27, preferably glycerine, which may be supplied through threaded opening which is closed by threaded plug 3'. The piston must pass through the liquid and in doing so the liquid is compelled to escape from one side of the piston to the other through holes 25. The size and number of the holes may vary, depending upon the weight of vehicle to which it is attached. Means are provided for securely fastening the lower part of the device to the axle of a vehicle and comprises clamp members 28, 29 and 30. Members 28 and 29 are clamped around the lower end of cylinder 1 and secured thereon by bolts 31. The end 32, so formed by these two clamping members 28 and 29, fits the shape of the outside of axle 33 whereby it may be securely bolted in position, as shown in Fig. 1, by bolts 34 combinedly received by end 32 of clamping members 28 and 29 and by clamping member 30 adjusted and so formed as to fit the shape of the inside of the axle.

In operation the mechanism of my device is as follows:

When, as may be perceived by referring to Fig. 1, the vehicle is traveling over perfectly smooth roadways my invention simply remains stationary with relation to the movement of piston 7 in cylinder 1, but immediately when the usual wheel attached to axle 33 at 35 encounters a hole or other depression in the roadway cylinder 1 attached to axle 33 is pulled downwardly thereby forcing a portion of liquid 27 through holes 25 which permits the liquid to escape from one side of piston 26 to the other. When the wheel mounts an elevation or in leaving a hole or other depression in the road-way axle 33 is moved upwardly and compresses spring 36 and simultaneously forces cylinder 1 upward thereby forcing a portion of liquid 27 through holes 25 and around flange 20' of cup washer 20 which reduces the compression in the spring. The reaction caused by a vehicle spring traveling from compression into tension is greatly reduced by my invention as the rate of movement is considerably reduced inasmuch as piston 26 must be forced through liquid 27 wherein movement in this direction causes the flange 20' of cup washer 20 to closely engage the sides of the cylinder walls thereby permitting the liquid to pass only through holes 25. The area of the holes is so arranged that the velocity of the upward movement of the chassis frame is materially reduced, thereby overcoming the momentum of the upward movement of the weight on the chassis frame, and preventing breaking or deforming spring 36 as well as causing occupants of the vehicle greater comfort.

An important advantage of my invention is that the flange 20' of cup washer 20 is so arranged in extending upwardly that axle 33 is permitted to move upwardly with more freedom of motion than downwardly because the flanged portion of the cup washer permits the escape of liquid from the bottom portion of the cylinder to the upper portion when the piston is moving downwardly and the opposite effect is produced when the piston moves upwardly as the flange of the cup washer is inclined to be forced in close contact with the cylinder walls thereby forcing the liquid only through holes 25, the passage around the cup washer being sealed.

Another important advantage of the preferred form of the construction embodied in my invention is that cylinder 1 may be made from an ordinary standard pipe of required size, and cut to the desired length and threaded at each end. Cap 2 may be a standard pipe cap. Reducer 3 may be a standard reducing pipe fitting connection and many other parts such as washers, nuts, bolts, piston rod, etc., may be purchased from a standard stock of materials some of which require slight alterations. This construction provides perfect freedom of side movement of the chassis frame relative thereto thus securing the advantage of an easier riding effect. To obtain this sidewise movement I have provided a ball and socket joint 37 connected between the chassis frame and my invention.

I desire to emphasize the fact that the conditions concurrent with the adaptation of my device will necessarily vary and that it is to be understood that it is not intended to confine the invention to the form of embodiment herein disclosed because it is susceptible of embodiment of various forms, all coming within the scope of the claims.

What I claim as new and desire to secure by Letters Patent is:

1. In a shock absorber, a cylinder having a removable head, a piston rod, a piston secured to the lower end of said piston rod comprising a pliable cup washer having its flange extending upwardly and having an eccentric perforation therethrough, an upper and a lower metal washer disposed at opposite sides of said cup washer respectively, and each having an eccentric hole therethrough adapted to register with said eccentric perforation, an upper and a lower nut threaded to said lower end of said piston rod, said upper nut in engagement with said upper metal washer, and said lower nut in engagement with said lower metal washer, a liquid contained within said cylinder and adapted to retard the movement of said piston, and means for securing the device to a vehicle, substantially as and for the purposes specified.

2. In a shock absorber, a cylindrical tube externally threaded at each end thereof, an internally threaded cap threaded to the lower end of said tube, a piston rod having its upper and lower ends threaded, a piston secured to the lower end of said piston rod and comprising a pliable cup washer having its flange extending upwardly and having an eccentric perforation therethrough, an upper metal washer and a lower metal washer disposed at opposite sides of said cup washer and each having an eccentric hole therethrough adapted to register with said eccentric perforation, an upper nut and a lower nut threaded to said lower end of said piston rod, said upper nut in engagement with said upper metal washer and said lower nut in engagement with said lower metal washer, a liquid contained in said cylindrical tube and adapted to retard movement of said piston, and means for enclosing the upper end of said cylindrical tube, substantially as set forth and for the purposes specified.

3. In a shock absorber, a cylinder having a removable head, a piston rod having its upper and lower ends threaded, a piston secured to the lower end of said piston rod and comprising a pliable cup washer having its flange extending upwardly and having a perforation therethrough, an upper metal washer and a lower metal washer disposed on opposite sides of said cup washer and each having holes therethrough adapted to register with said perforation, an upper nut and a lower nut threaded to said lower end of said piston rod, said upper nut in engagement with said upper metal washer and said lower nut in engagement with said lower metal washer, a reducing member threaded to the upper portion of said cylinder, a pair of flanged tubes threaded in the reduced end of said reducing member and having packing disposed therebetween for engagement with said piston rod, a liquid contained within said cylinder and adapted to retard the movement of said piston and means for securing the device to a vehicle chassis frame and axle, substantially as and for the purposes specified.

4. In a shock absorber, a cylinder having a removable head, a piston rod having its upper and lower ends threaded, a piston secured to the lower end of said piston rod comprising a pliable cup washer having its flange extending upwardly and having an eccentric perforation therethrough, an upper metal washer and a lower metal washer disposed on opposite sides of said cup washer and each having an eccentric hole therethrough adapted to register with said eccentric perforation, an upper nut and a lower nut threaded to said lower end of said piston rod, said upper end in engagement with said upper metal washer and said lower nut in engagement with said lower metal washer, a reducing member threaded to the upper portion of said cylinder, a pair of flanged tubes threaded in the reduced end of said reducing member and having packing disposed therebetween for engagement with said piston rod, a liquid contained within said said cylinder and adapted to retard the movement of said piston, and means for securing the device to a vehicle frame and axle comprising a ball and socket joint, and means for fixing the lower end of said cylinder to a vehicle axle.

5. In a shock absorber, a cylinder having a removable head, a piston rod having its upper and lower ends threaded, a piston secured to the lower end of said piston rod and comprising a pliable cup washer having its flange extending upwardly and having an eccentric perforation therethrough, an upper metal washer and a lower metal washer disposed at opposite sides of said cup washer and each having an eccentric hole therethrough adapted to register with said eccentric perforation, an upper nut and a lower nut threaded to said lower end of said piston rod, said upper nut in engagement with said upper metal washer and said lower nut in engagement with said lower metal washer, a reducing member threaded to the upper portion of said cylinder, a pair of flanged tubes threaded in the reduced end of said reducing member and having packing disposed therebetween for engagement with said piston rod, a liquid contained within said cylinder and adapted to retard movement of said piston, means for securing the device to the chassis frame comprising a ball and socket joint secured to the upper end of said piston rod consisting of a ball member threaded to said piston rod and a pair of socket members adapted to be fixed to said chassis frame, means for fixing the lower end of said cylinder to a vehicle axle comprising a pair of clamping members secured around said cylinder and forming an end adapted to fit the outer side of said axle and a cooperating clamping member having its inner side formed and adapted to fit the inner side of said axle and means for securing said end of said pair of clamping members and said cooperating clamping members in engagement with said axle, substantially as set forth and for the purposes specified.

6. In a shock absorber, a cylinder, a piston rod having its lower end threaded, a piston attached to said piston rod and comprising a cup washer having its flange extending upwardly and having an eccentric perforation therethrough, a pair of relatively flat washers adjacent the sides of said cup washer and each having an eccentric hole therethrough and adapted to register with said eccentric perforation, an upper nut and a lower nut threaded to said lower end of said piston rod and adapted to compress said cup washer and said pair of relatively flat washers, a liquid contained in said cylinder and adapted to force the flange of said cup washer inwardly when said piston is moved downwardly and to force said flange outwardly when the piston is moved upwardly through said liquid, substantially as and for the purposes specified.

7. In combination with an automobile, a shock absorber comprising a cylinder, a piston rod, a piston secured thereto and having a hole therethrough, a pliable cup washer with its flange disposed upwardly in said cylinder and forming a part of said piston, a liquid contained in said cylinder adapted to retard the movement of said piston, a ball fixed to the upper end of said rod, a socket fixed to the frame of said automobile and receiving said ball and means for securing said cylinder to the axle of said automobile.

8. In combination with an automobile, a shock absorber comprising a cylinder, a piston rod a piston secured thereto and having a hole therethrough, a pliable cup washer with its flange disposed upwardly in said cylinder and forming a part of said piston, a liquid contained in said cylinder adapted to retard the movement of said piston, a ball fixed to the upper end of said rod, a socket fixed to the frame of said automobile and receiving said ball, means for securing said cylinder to the axle of said automobile and comprising a support fixed to the lower end of said cylinder and having a fitted side in engagement with the other side of said axle, and means for detachably retaining said support and said clamp in immovable position relative to said axle whereby said cylinder is fixed to said axle.

ANDREW G. HAUCK.